US005422996A

United States Patent [19]

Patil et al.

[11] Patent Number: 5,422,996

[45] Date of Patent: Jun. 6, 1995

[54] SYSTEM FOR RASTER IMAGING WITH AUTOMATIC CENTERING AND IMAGE COMPRESSION

[75] Inventors: Suhas S. Patil; Chester F. Bassetti, Jr., both of Cupertino; Dayakar C. Reddy, Milpitas, all of Calif.

[73] Assignee: Cirrus Logic, Inc., Milpitas, Calif.

[21] Appl. No.: 164,312

[22] Filed: Dec. 9, 1993

Related U.S. Application Data

[63] Continuation of Ser. No. 771,875, Oct. 2, 1991, Pat. No. 5,293,474, which is a continuation of Ser. No. 632,583, Dec. 20, 1990, abandoned, which is a continuation of Ser. No. 336,384, Apr. 10, 1989, abandoned.

[51] Int. Cl.[6] .......... G06F 15/50

[52] U.S. Cl. .......... 395/164

[58] Field of Search .......... 395/144, 145, 148, 63, 395/83, 162, 164; 400/63, 83; 358/101, 106, 107, 111; 345/189, 190, 191

[56] References Cited

U.S. PATENT DOCUMENTS 4,706,076 11/1987 Racchini .......... 340/726
4,737,916 4/1988 Ogawa et al. .......... 364/443
4,751,502 6/1988 Ishii et al. .......... 340/709
4,755,810 7/1988 Knierim .......... 340/726
4,768,095 8/1988 Wada et al. .......... 358/183
4,824,106 4/1989 Ueda et al. .......... 273/1 E
4,852,024 7/1989 Kurakake et al. .......... 364/521
5,293,474 3/1994 Patil et al. .......... 395/148

*Primary Examiner*—Phu K. Nguyen
*Attorney, Agent, or Firm*—Skjerven, Morrill, MacPherson, Franklin & Friel

[57] ABSTRACT

The system provides for vertical or horizontal centering, or both, without the use of a memory frame buffer, of raster image data whose start time and duration cannot be controlled. The centering is accomplished by controlling the frame start time and line start time of the overall display of the raster imaging surface. This is accomplished in the case of vertical centering by detecting the time of the beginning of the first or last line, or both, of the total lines of the raster image data to be displayed an controlling the start time of a subsequent one of the frames based on that detected time. Horizontal centering is carried out by detecting the time of the beginning of the first or last column, or both, of the columns in one or more of the lines of the raster image data and controlling the start time of subsequent ones of the lines based on that detected time.

11 Claims, 12 Drawing Sheets

State Machine Clock: PixelClk
State Vector: CS[2,1,0]
State transitions occur on the rising edge of PixelClk ColOper = Cs3
PanelOper = Cs4
DE = Display Enable

SYSTEM FOR RASTER IMAGING WITH AUTOMATIC CENTERING AND IMAGE COMPRESSION

This application is a continuation of application Ser. No. 07/771,875, filed Oct. 2, 1991, U.S. Pat. No. 5,293,474 which is a continuation of Ser. No. 07/632,583, filed Dec. 20, 1990, abandoned, which is a continuation of Ser. No. 07/336,384, filed Apr. 10, 1989, abandoned.

BACKGROUND OF THE INVENTION

1. Field of the Invention

This invention pertains to the field of raster image systems and relates more particularly to the field of raster image systems for driving display, hardcopy or other graphical output devices such as used for displaying photographs, printing, imaging or otherwise outputting as a two-dimensional image text, diagrams, graphs and pictures.

2. Prior Art

Many imaging devices, such as television or computer monitors that include cathode ray tubes (CRT's), receive as their input a single stream of raster data and display this raster-image data in a series of lines which constitute a frame. On the other hand, some flat-panel displays, such as liquid crystal displays (LCD's), particularly the larger ones, are made of two segments, an upper segment and a lower segment, that operate in parallel and that require two parallel streams of data, one for each segment.

In the prior art, the task of generating two streams of data for use in flat-panel displays from the single stream of raster image data typically produced by controllers for CRT displays has been achieved using a frame buffer large enough to store the entire contents of one frame of data which was then read out as two streams of data. Examples of such prior art are chips for video-to-LCD conversion such as the SED 1341 $F_{OE}$ and the SED 1345 $F_{OA}$, both from SMOS Systems, Inc. (Technical Manual SED 1341 $F_{OE}$, 1988 and Technical Manual SED 1345 $F_{OA}$, SMOS Systems, Inc., 2460 North First Street, San Jose, Calif. 95131). Both of these chips require a minimum of one bit of data for each pixel in the frame. For example, the chip SED 1341 $F_{OE}$ requires 40K bytes of memory to work with 640 times 480 display (Page 38, Technical Reference Manual SED 1341 $F_{OE}$). An example of a suitable LCD for use in the present invention is the model LM640487Z sold by the Elecom Group of the Sharp Corporation.

In producing an image on an imaging device, there is often a need for centering the image to be displayed (or otherwise input), on the imaging device. In the prior art, centering of an image on the imaging device required altering the characteristics of raster data from the source or the use of flexible imaging devices, such as CRT's with multisync capabilities. Currently available flat panel displays, such as LCD's, have no such flexibility. In the prior art, the control of image position was dependent on ensuring the proper positioning of horizontal and vertical synchronization signals.

SUMMARY OF THE INVENTION

The present invention provides for driving a multisegment raster imaging device. The present invention is particularly useful when used with the grayscale shading techniques disclosed in copending application Ser. No. 07/334,622, filed Apr. 9, 1989, titled "Method And Apparatus For Producing perception Of High Quality Grayscale Shading On Digitally Commanded Displays", assigned to the same assignee as the present application. That application is incorporated herein by reference. The present invention provides a design with sufficient speed so that dynamic random access memories (DRAMS), which are less expensive but slower than static random access memories (SRAMS), can be used as buffer memory.

The present invention applies multiple transformations on an input stream of raster data for increased speed of operation and superior results from applying the transformation even in the context of the data compression and double-stream output requirements described above.

The present invention is capable of automatically centering a raster image of arbitrary height on the imaging device. This is accomplished using multiple-state-machine-based control for flexibility in altering and adapting the design, and for performing the above functions in one integrated system.

The present invention also provides for image compression, where a stream of raster data describing an image that is larger horizontally than the imaging device can be compressed to fit into the desired area.

DESCRIPTION OF THE PREFERRED EMBODIMENT

Figure 1:
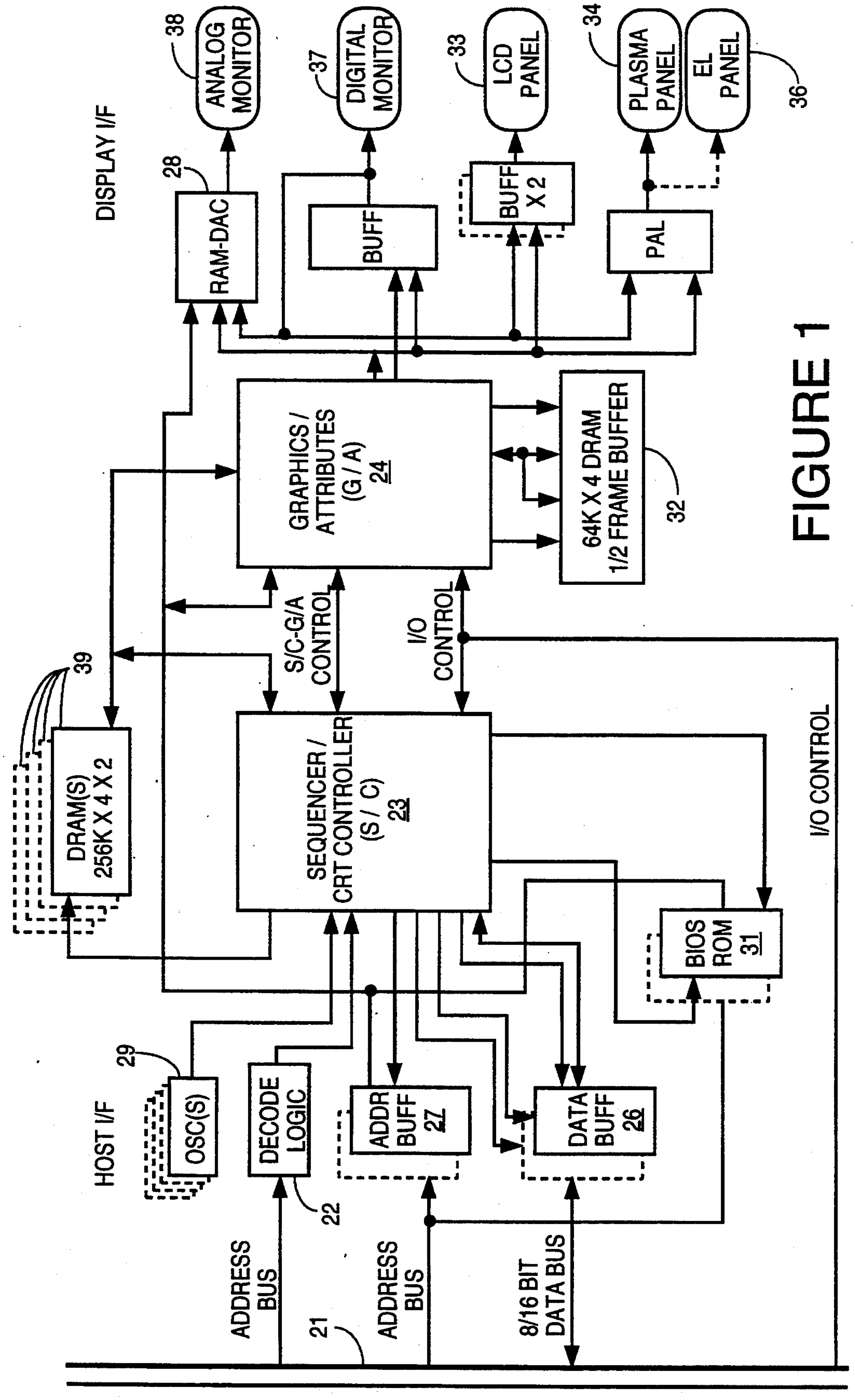
FIG. 1 is a block diagram showing a graphics display system in which this invention may be employed.

Referring to FIG. 1 there is shown the portion of a system for employing Video Graphics Array (VGA) graphics in connection with an IBM PC/AT or PC/XT or equivalent computer system. The system includes a host bus 21 which acts as an interface between the host computer (not shown) and the VGA graphics portion. Address information is supplied on an address bus to address decode logic 22 whose output is supplied as one input to a sequencer/CRT controller 23. Sequencer/-controller 23 communicates with a graphics attribute controller 24 through two buses identified as S/C-G/A control and I/O control. Elements 23 and 24 may be of the type shown and described in the publication entitled "CL-GD 610/620 CRT/Flat Panel Enhanced VGA Controller" Preliminary Data Sheet, March, 1989, published by Cirrus Logic, Inc., Milpitas, Calif. This publication is incorporated herein by reference.

The system of FIG. 1 includes an 8 or 16 bit data bus which conveys data to and from host interface 21 through a data buffer 26. An additional address bus is connected to a buffer 27 which communicates with sequencer/controller 23 and a random access memory-digital-to-analog converter (RAMDAC) 28. The system also includes a plurality of oscillators 29 for providing different frequency clock signals, as is well known in the art.

A Basic Input Output System (BIOS) ROM 31 is employed to store the VGA BIOS information. ROM 31 receives address control signals from element 23 through a bus 23*a* and supplies ROM output data on a bus 31*a*. The ROM address information on bus 23*a* is utilized in accordance with the teachings of the present invention, as will be described in detail below.

The system of FIG. 1 further includes a ½ frame dynamic random access memory (DRAM) buffer 32 connected to the graphics attributes device 24 and employed in generating raster imaging information for use in imaging frames of information on raster type devices such as a liquid crystal display (LCD) 33, a plasma panel 34, an EL panel 36, a printer, or a digital or analog cathode ray tube (CRT) represented by digital and analog monitors 37 and 38, respectively. Half frame buffer memory 32 is preferably The system of FIG. 1 also includes a dynamic random access memory represented by DRAMs 39 for storing raster imaging information supplied from the host system to element 23 through the 8/16 bit data bus and for supplying the stored information to one or more of the raster imaging devices.

Figure 2:
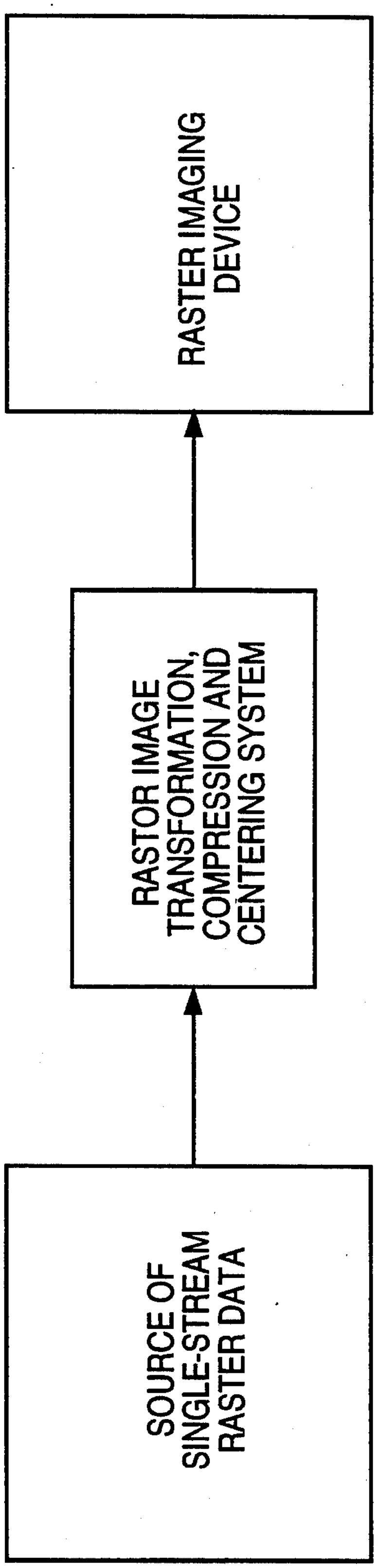
FIG. 2 is a diagram showing the functioning of the invention in processing a single stream of raster image data.

The present invention is a part of the graphics attribute controller 24. Its function is shown in FIG. 2. Other circuitry in the graphics attribute controller provides the present invention with a source of raster image data in a single stream. The present invention transforms, optionally compresses and optionally centers the image data before passing it on to a raster imaging device.

Figure 3A:
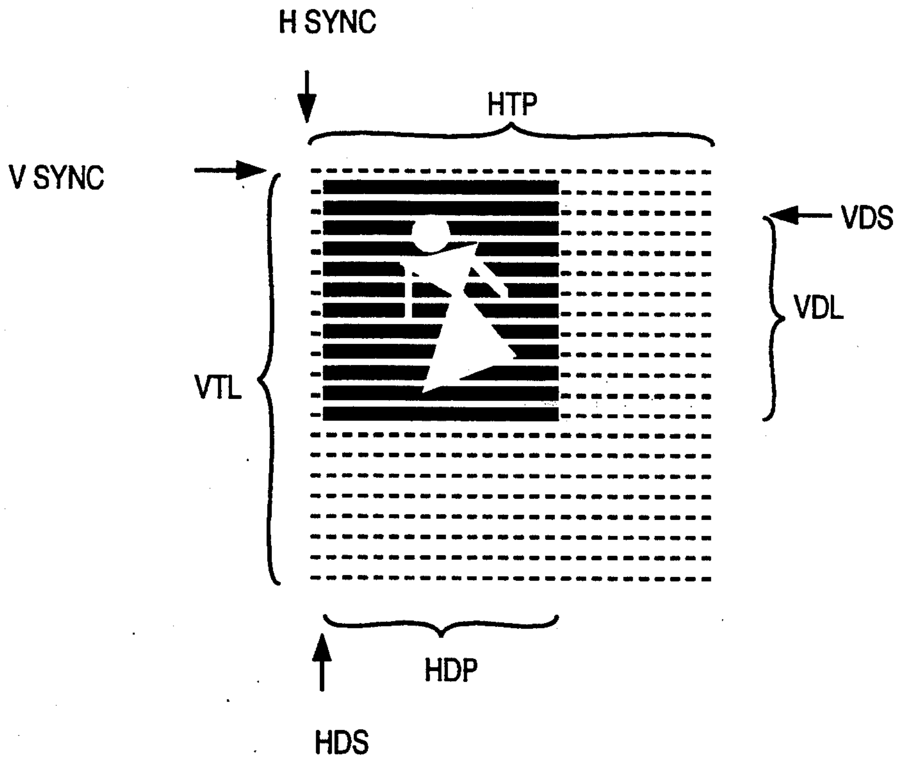
FIGS. 3*a*–3*d* illustrate the operation of the invention in providing image centering.

A raster data stream consists of a temporal sequence of frames, where each frame consists of a vertical sequence of horizontal lines and where each line consists of a sequence of pixels (i.e. picture elements). FIG. 3*a* shows a typical raster data stream generated for producing images on devices such as TV monitors, video displays or computer terminals. Each dot represents one pixel time. The data stream (shown as a thick line) describes the visual characteristics (color and/or intensity) of each pixel. The timing signals V Sync and H Sync mark the start of a frame and the start of a line, respectively. The source of raster data determines the parameters of the raster data stream such as the total number of lines in the frame (Vertical Total or VTL), the total number of pixel times in a line time (Horizontal Total Lines or HTL), the number of lines containing valid data to be displayed (Vertical Display Lines or VDL), the number of pixels of displayed data in a line (Horizontal Display Pixels or HDP), the location of the start of the first displayed line (Vertical Data Start or VDS), with respect to V Sync and the number of Pixel times between the H Sync signal and the first pixel in the line (Horizontal Data Start or HDS). These parameters may vary from image to image and application to application.

Figure 3B:
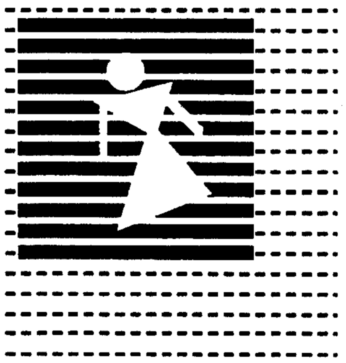
Figure 3C:
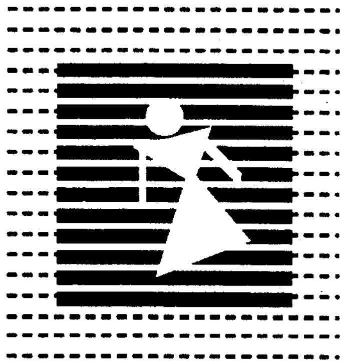

Some imaging devices, such as the multisync CRT, are flexible with respect to the number of image lines and the number of image pixels that the imaging device can work with. Other imaging devices, such as a flat-panel LCD display as used in a lap-top computer, have a fixed format; each make and model may have a unique and inflexible set of parameters such as total lines displayed, total pixels in a line, location of the first displayed line in a frame and location of first displayed pixel in a line. FIG. 3*b* shows how this data stream might look on such an LCD panel. The one blank line at the top (shown as a thin line) corresponds to the one data-less line at the top of FIG. 3*a*. FIG. 3*c* shows how one would like this raster data to be displayed on the LCD; viewers may prefer a vertically and horizontally centered image.

Figure 3D:
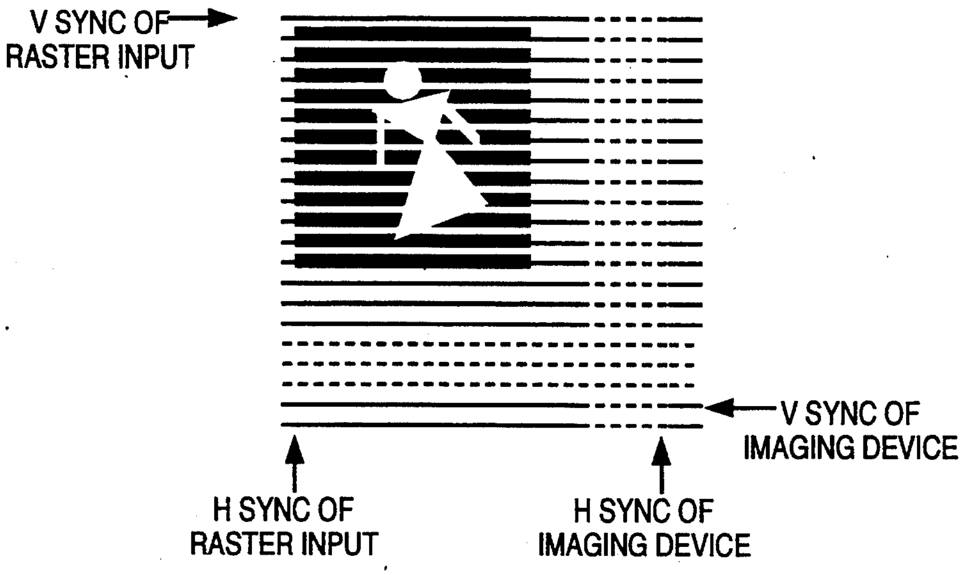

In the present invention, the display picture is centered without the need to alter the input video data. FIG. 3*d* shows the temporal sequence that must occur for the raster data to be displayed centered in both dimensions. As shown, the LCD imaging device must start each line prior to the end of the previous line (as defined by H Sync), and must start each frame prior to the end of the previous frame (as defined by V Sync). The basis of the invention is to synchronize with respect to the start or the end of the display data, not with respect to the timing signals H Sync and V Sync.

The preferred embodiment described herein implements only automatic vertical centering. Nevertheless, the invention claimed herein can realize both horizontal and vertical centering. The preferred embodiment does not make use of the V Sync timing signal. Its current dependence on H Sync for centering purposes could be removed by the same technique as is applied to remove dependence on V Sync.

Figure 4A:
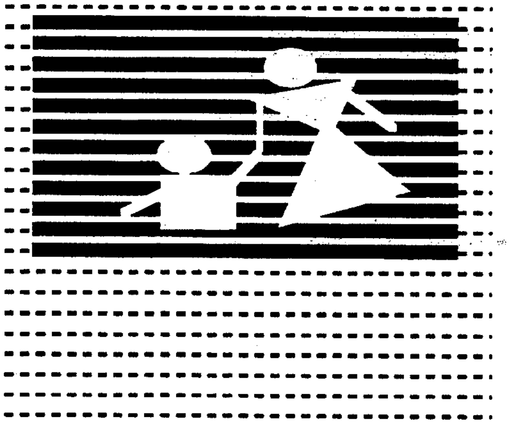
FIGS. 4*a*–4*c* show the operation of the invention in providing image compression.
Figure 4B:
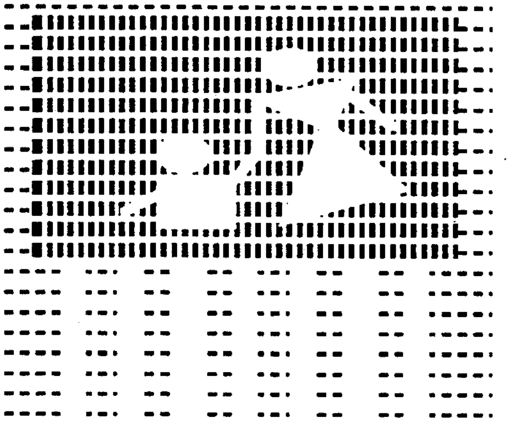
Figure 4C:
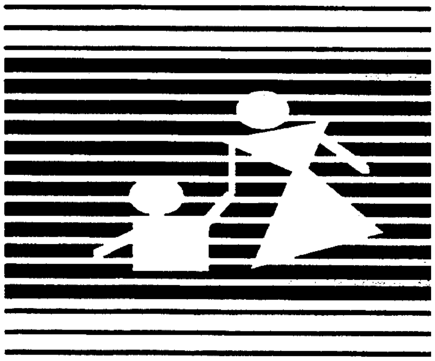

In addition to centering, interfacing from typical raster data to an imaging device with a fixed number of pixels sometimes requires compressing of the image. FIG. 4*a* shows an image that is too wide for the display lines shown in FIG. 4*c*. FIG. 4*b* shows the image broken into pixels. The missing dots in FIG. 4*b* show how by taking every ith pixel and omitting it, or merging it with its neighbor, the image can be compressed to fit the display device with loss of visual quality that may be acceptable to the viewer.

The preferred embodiment of this invention is shown in FIGS. 5–11. This embodiment employs DRAMS for frame buffer storage. The DRAMS are used in a page-mode read-modify-write manner of operation for achieving superior speed of operation for a given choice of technology.

Figure 5:
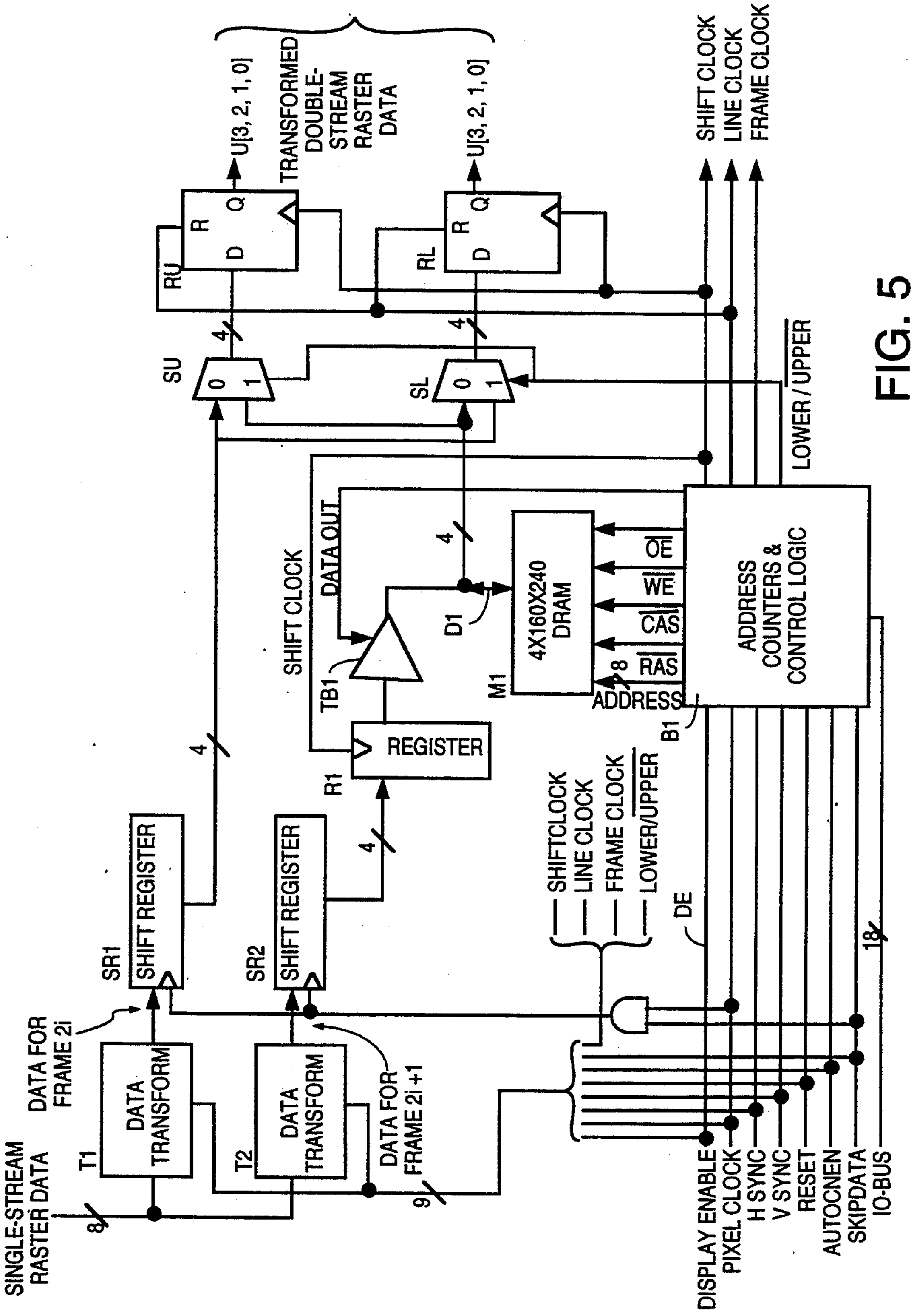
FIG. 5 is a block diagram of the preferred embodiment for carrying out the present invention.

The block diagram of FIG. 5 shows the logic of the entire embodiment as well as the data-flow. The details of the Address Counters and Control Logic block B1 of FIG. 5 are shown in FIGS. 6–11. An explanation of the operation of the diagram of FIG. 5 is as follows. Data transformations on the single-stream raster data input (such as converting color data to black and white data or controlling pixel intensities to achieve the effect of a half-tone picture on a digital imaging device) are performed by Data Transforms T1 and T2. Transform T1 affects the data that goes directly to the two-segment imaging device. Transform T2 affects the data that goes to the imaging device after being stored in the DRAM memory M1. In the case of an imaging device having a number K of segments therein, a number K of Data Transforms similar to elements 41 and 42 are required.

In general, these transformation functions can depend on a number of parameters, accept the Single-Stream Raster Data data signals in various data widths, and produce outputs of various widths. The specific Data Transforms T1 and T2 of the preferred embodiment generate gray-shades control and depend on the row and column locations of the pixel in a frame and the serial number of the frame. They receive as input the timing signals ShiftClock, LineClock, FrameClock, and Lower/$\overline{\text{Upper}}$ generated by block B1. Each of Data Transforms T1 and T2 produces a single-bit-wide output to meet the requirements of a class of digitally controlled LCD panels such as those manufactured by Sharp and Epson. T1 produces a data stream describing the double-segment raster frame $2i$, while T2 produces a data stream describing the frame $2i+1$.

Each of the shift registers SR1 and SR2 is clocked by the Pixel Clock timing signal ANDed with the SkipData control signal. The SkipData control signal implements the requirement for data compression. Any pixel data that appears on the single-stream raster input when SkipData is 0 is either ignored or merged with the next pixel. Shift registers SR1 and SR2 assemble a four-bit word which represents data for four adjacent pixels from the output of T1 or T2, respectively. The 4-bit output of the shift register SR1 goes to the 0 input of the selector SU as well as to the 1 input of the selector SL. The output of the shift register SR2 goes to the data input of the 4-bit register R1.

Register R1 is clocked by the timing signal Shift Clock, which is produced by Address Counter and Control Logic block B1. The Shift Clock timing signal operates at a rate ¼ that of the Pixel Clock timing signal. It provides the timing to handle 4 pixels of data at a time for each of the two segments within a frame. Register R1 loads the output of shift register SR2 at the right time (as defined by the Shift Clock timing signal) and holds this value as a constant input to tristate buffer TB1 while shift register SR2 is assembling the next 4 pixels of data. The ShiftClock timing signal also clocks registers RU and RL which receive their data from selectors SU and SL, respectively, and output the double-stream raster data to the double-segment display device. Registers RU and RL are reset by the timing signal LineClock.

Bidirectional bus D1 sends data to DRAM memory M1 and receives data from this memory. Tristate Buffer TB1 supplies data on bidirectional bus D1 when the Data Out control signal (generated by block B1) is 1. DRAM memory M1 supplies data on bus D1 only when the control signal $\overline{\text{oe}}$ (NOT output enable generated by block B1) is a 0. Block B1 also produces the bus Address and the control signals $\overline{\text{ras}}$ (NOT row address), $\overline{\text{cas}}$ (NOT column address), and $\overline{\text{we}}$ (NOT write enable) for operating DRAM memory M1 in the desired mode.

The operation of Address Counters and Control Logic block B1 is governed by software-controlled parameters, which are set and interrogated via the input/output bus IO bus. Bus IO-bus is an input/output bus which provides the software read/write mechanism for the ROR, RSTR, COR and CTR registers. The IO-bus has eight address lines R address, eight data lines R data, a write control line R write, and a read control line R read.

In addition, block B1 (as well as Data Transforms T1 and T2) receives as input the timing signals Pixel Clock, V Sync, H Sync and Display Enable as well as the control signals Reset, AutoCnEn (auto centering enable) and SkipData. Block B1 uses these input signals to keep track of the position of the pixel for which data is being received, both with respect to the two-dimensional position of the current pixel within a frame and with respect to the temporal position of the current frame in the series of frames. Block B1 contains logic circuits to maintain row count, column count and frame count and to produce the desired address and control signals as required by DRAM memory M1.

The present invention combines both automatic control of the vertical centering operation and software-specified parameters and control. This software control (which is typically exercised by the Video BIOS) is usable both to adapt the invention to different display or imaging devices and to vary the display or image on a particular device. The software control is realized by the AutoCnEn control signal as well as the parameters Row Offset, (RO), Column Offset (CO), Row Segment Total (RST), and Column Total (CT).

When auto-centering is disabled by the AutoCnEn control signal, the software has direct control over the vertical position of the image on the imaging surface. Increasing the value of the Row Offset parameter by one moves the image up one line on the imaging surface (assuming the imaging device produces lines from top to bottom). When auto-centering is enabled, the present invention detects how many displayed lines are in the current image and, from that information, computes the required value of the offset parameter that specifies how far down the display surface the image should start. In the next frame, the image is offset appropriately. The Row Offset parameter is not ignored when auto-centering is active; rather it is loaded by the software with a value that is independent of image size, but that can still be used to adjust the exact position of the image on the surface.

Regardless of auto centering, the software has direct control over the horizontal position of the image on the imaging surface. Increasing the value of the Column Offset parameter moves the image right one pixel on the imaging surface (assuming the imaging device produces pixels from left to right).

Two parameters allow the present invention to be used with a range of imaging devices without requiring any hardware changes. The Row Segment Total (RST) parameter must be set to the number of rows or lines in each of the two segments of the display, i.e. RST must De 240 for a two-segment LCD panel of 480 lines. The Column Total (CT) parameter must be set to the number of columns in the imaging device divided by 4 (which is the number of Shift Clock timing signals that are required to handle one line of raster data). Any values of the RST or the CT parameter that does not correspond to the display or imaging device being used may result in an ill-formed image, and possibly an unstable image.

Block B1 also generates the control signal Lower/$\overline{\text{Upper}}$ which controls the selection of the source of data by selectors SU and SL. Further, B1 generates the timing signals Shift Clock, Line Clock and Frame Clock as required by the two-segment imaging device.

Figure 6:
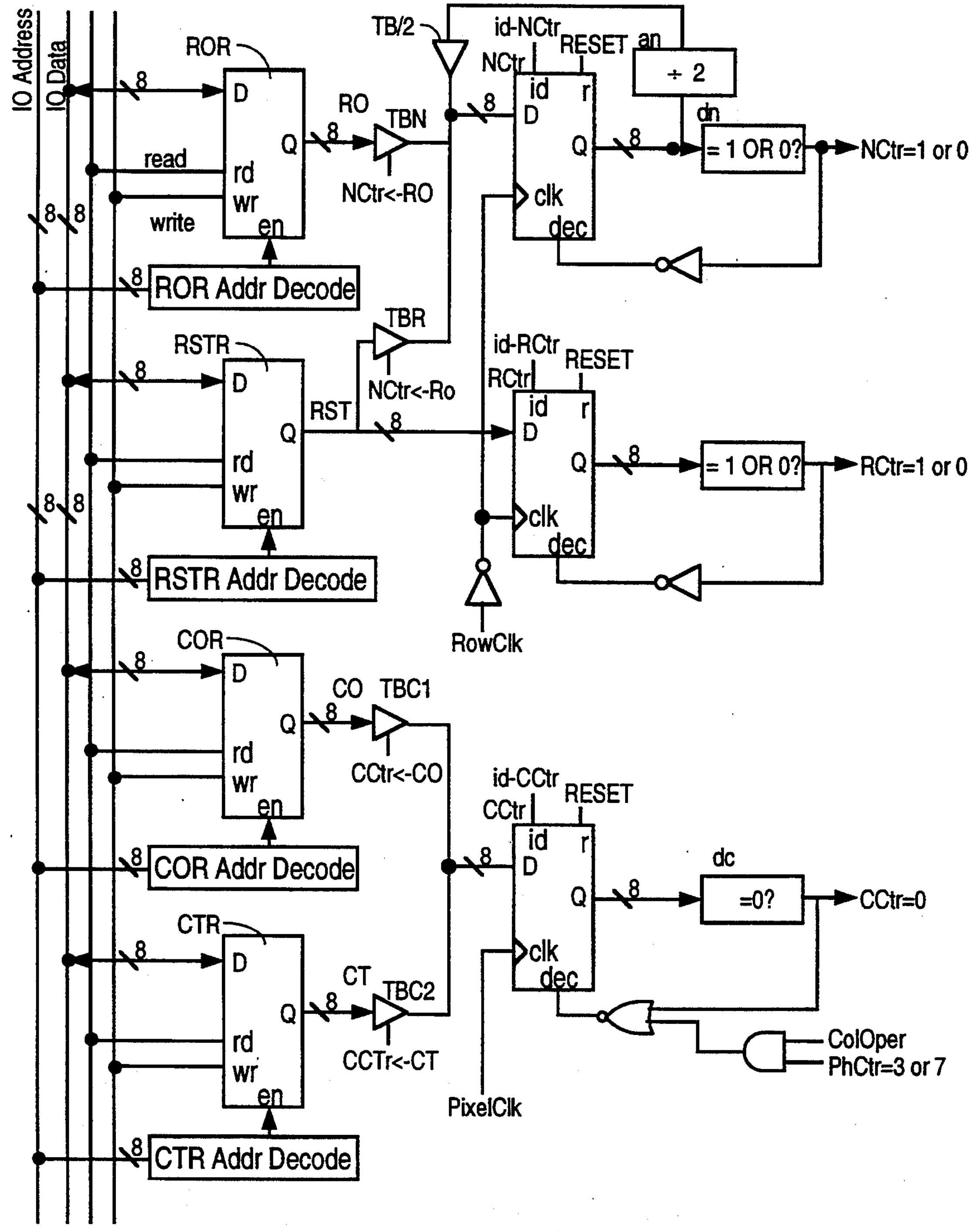
FIGS. 6–8 are block diagrams showing different elements of the logic circuitry utilized in this invention.
Figure 7:
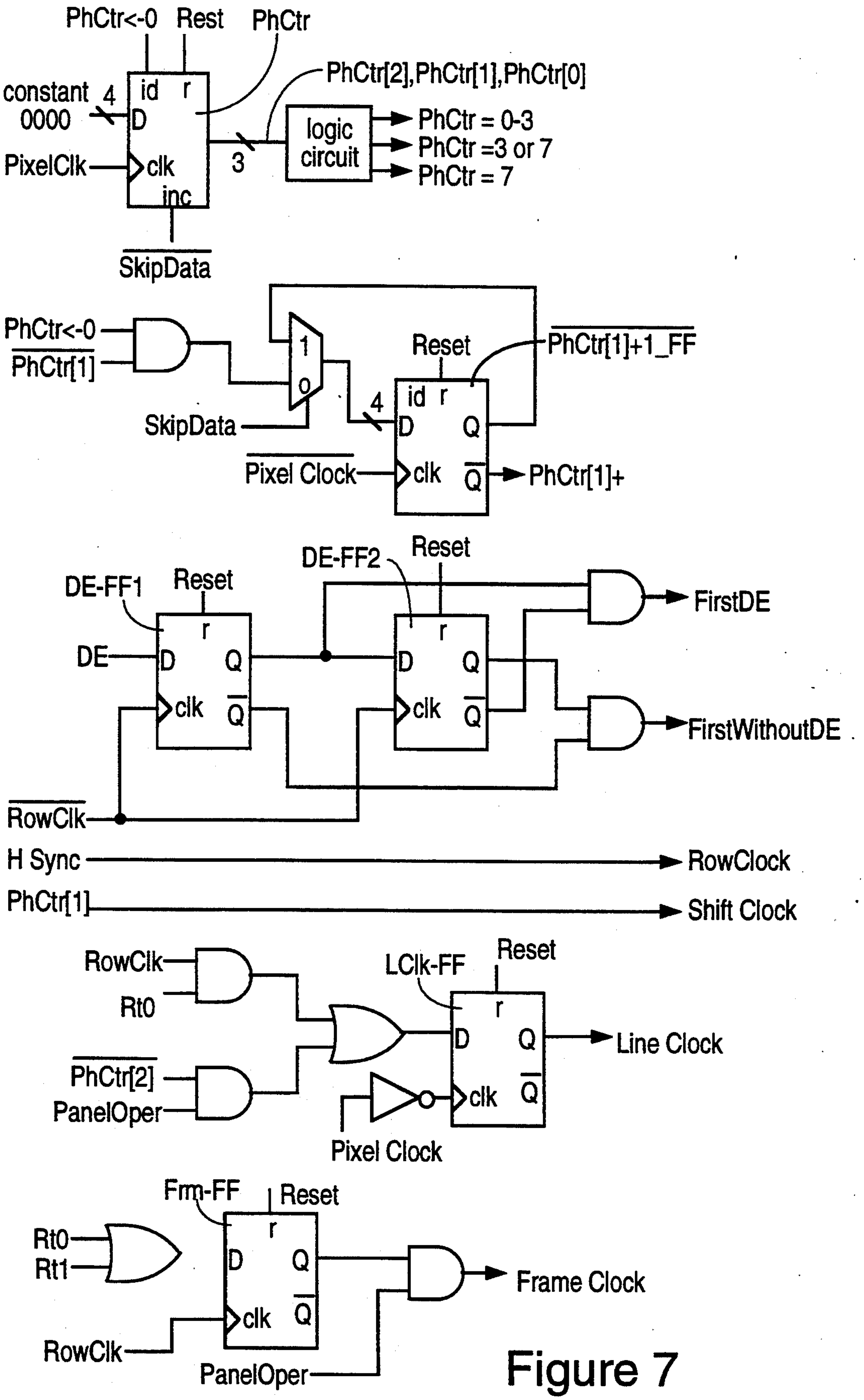
Figure 8:
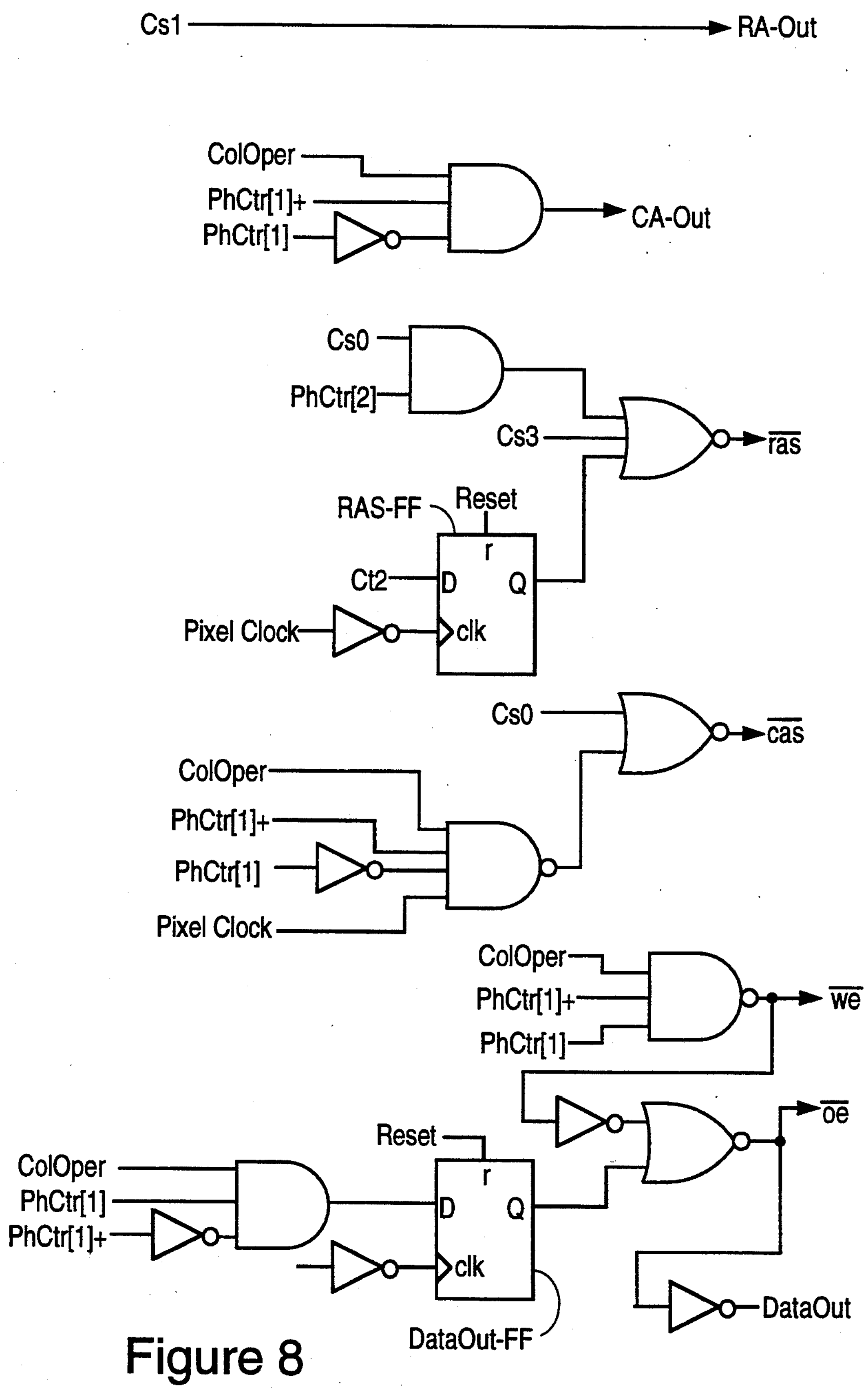
Figure 9:
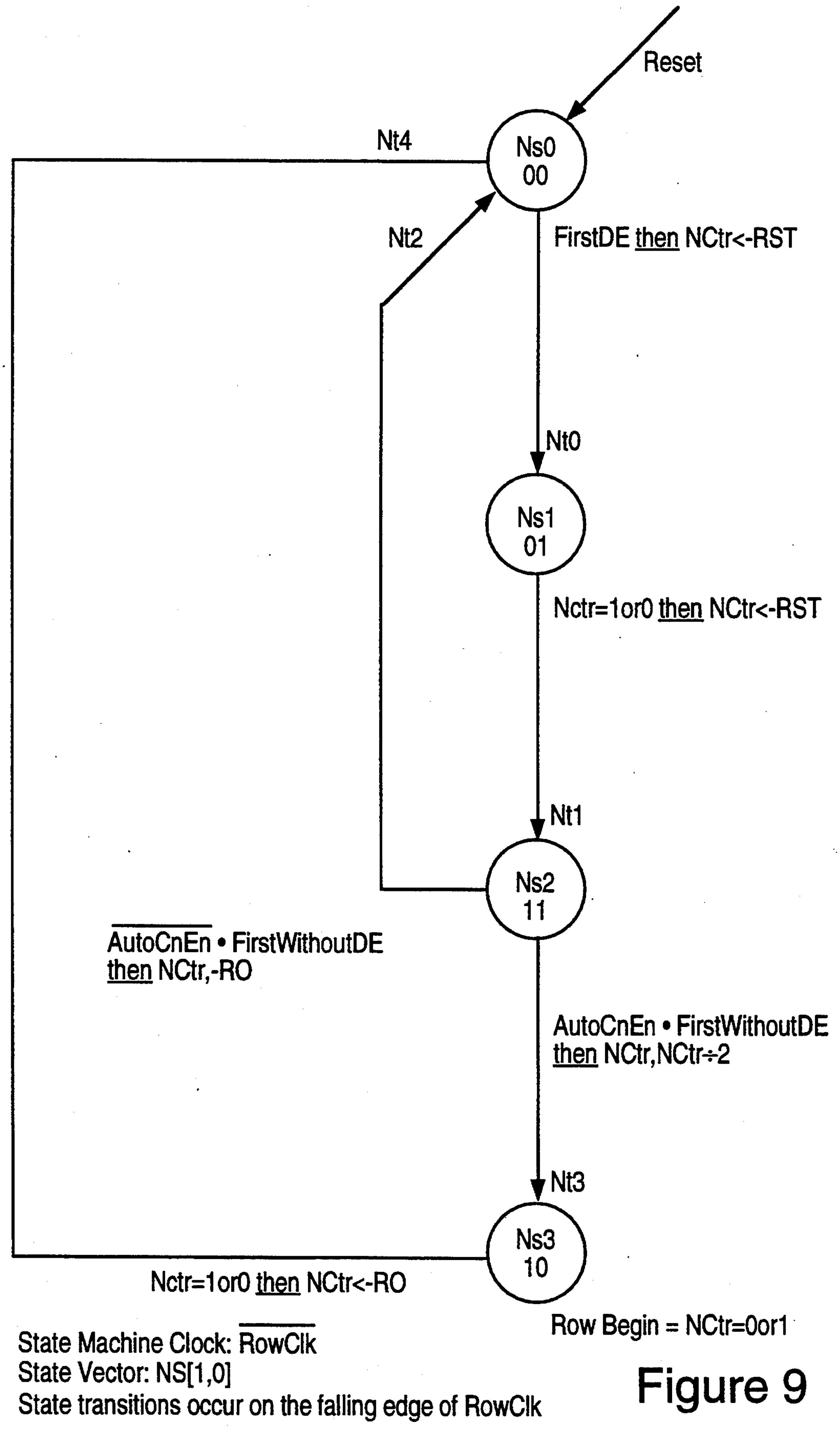
FIGS. 9–11 are state machine diagrams showing the operation of different techniques of the invention.
Figure 10:
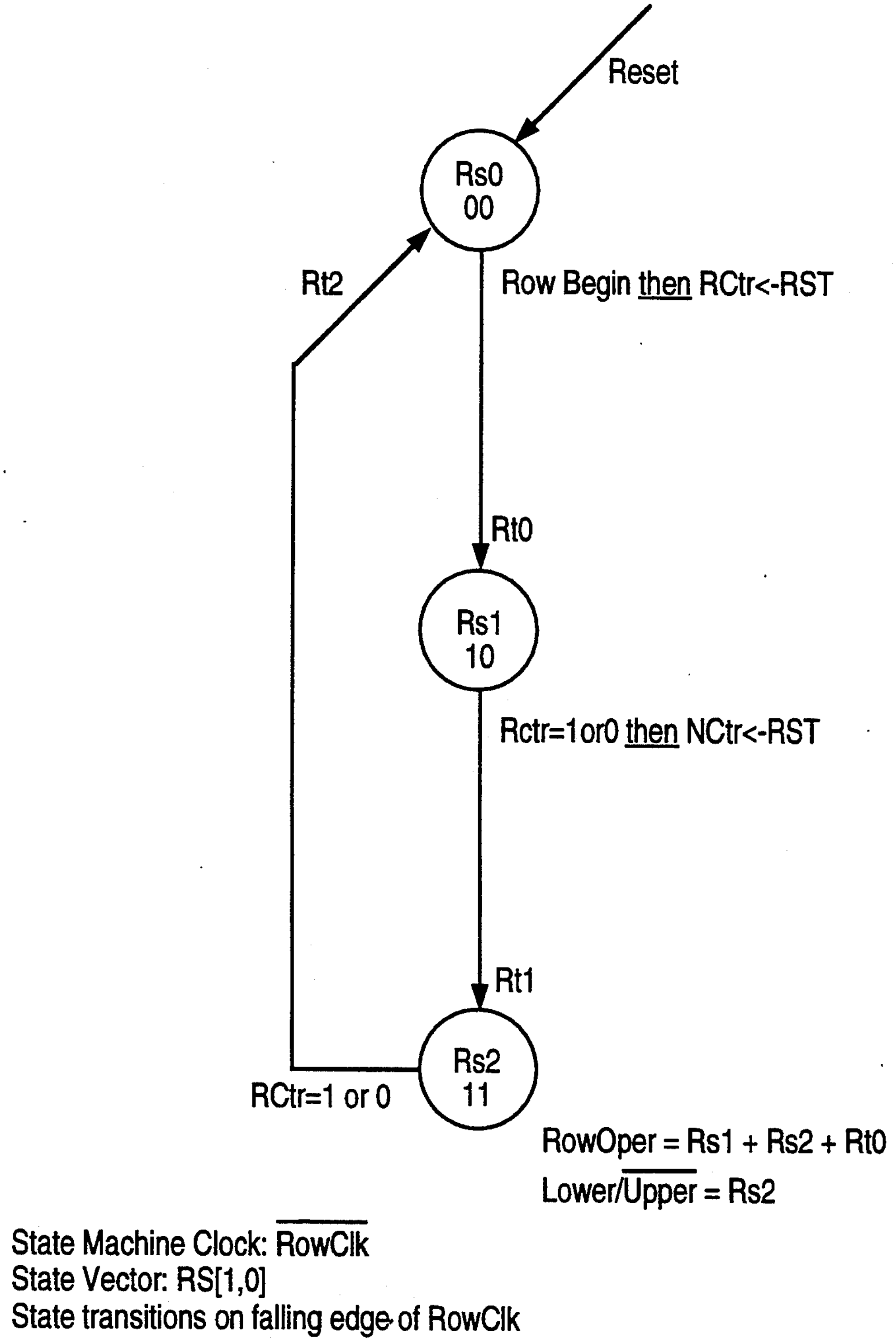
Figure 11:
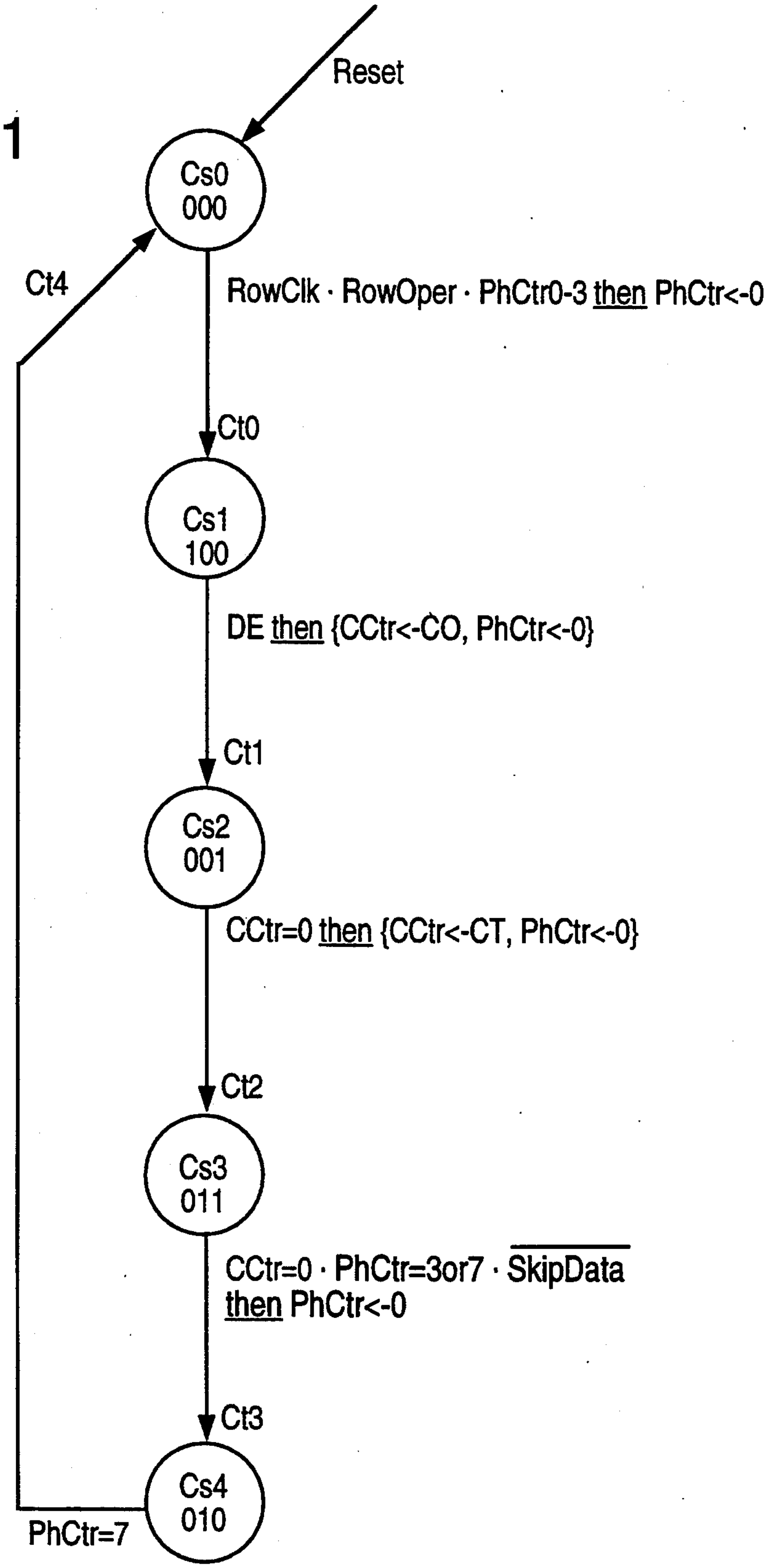

The preferred embodiment of the Address Counters and Control Logic block B1 is shown in the logic diagrams of FIGS. 6–8 and the state machine diagrams of FIGS. 9–11.

In FIG. 6, ROR (row offset register), RSTR (row segment total register), COR (column offset register) and CTR (column total register) are 8-bit registers which hold block Bl's software-controlled parameters, i.e. parameters RO, RST, CO and CT.

RCtr and CCtr are row and column counters. NCtr is a counter used in realizing vertical (row) offset and vertical centering. All three counters are loadable and decrementing counters. Each of the counters has feedback logic that disables the counter from decrementing any further when its value reaches 1 or 0: counters NCtr and RCtr stop at a value of 1 or 0: (i.e. decrementing is disabled until another value is loaded into the counter). The counter CCtr stops: (i) at the value 0, (ii) when the Skip Data control signal is 1 or (iii) when the control signals ColOper and PhCtr=3or7 are both 1. Each of the three counters is reset to 0 when the Reset signal is a 1. Each counter performs a synchronous load of its value from its D input bus at the rising edge of its clk input when its 1*d* input is a 1.

Tristate buffers TB/2, TBN and TBR select what data is loaded into the counter NCtr: if the control signal NCtr<-RO is a 1, then the counter receives the value RO put into it; if the control signal NCtr<-RST is a 1, then the counter gets the value RST; and if the control signal NCtr<-NCtr+2 is a 1, then the counter receives a value that is half the value of NCtr. To avoid a conflict, at most one of the control signals NCtr<-RO, NCtr<-RST and NCtr<-NCtr+2 is a 1 at any given time.

Tristate buffers TBC1 and TBC2 select the value that is loaded into the counter CCtr when 1d-CCtr is a 1: If control signal CCtr<-CO is a 1, then the counter CCtr gets loaded with the value CO; and if the signal CCtr<-CT is a 1, then the counter CCtr gets loaded with the value CT. To avoid conflict, both CCtr<-CO and CCtr<-CT are never 1 at the same time.

Counters NCtr and RCtr are clocked by a synchronizing signal called RowClk which occurs once every line. In this embodiment, RowClk is the same as the H Sync signal. In other embodiments it could either be directly supplied to the control block B1 or be derived from the Display Enable Signal if it is an integrated signal encoding both display enable and horizontal sync functions.

FIGS. 7 and 8 show the logic for control signals PhCtr[2], PhCtr[1], PhCtr[0], PhCtr=0–3, PhCtr=3or7, PhCtr=7, FirstDE, and FirstWithoutDE, and clock signals RowClk, Shift Clock, Line Clock, and Frame Clock.

FIGS. 9, 10, and 11 show state diagrams for the three state machines that provide control signals needed in the logic circuit of FIGS. 6, 7 and 8. FIG. 9 shows the Vertical Centring/Offset State Machine, FIG. 10 shows the Row State Machine and FIG. 11 shows the Column State Machine. A description of the state machines and the operations that they control follows.

Taken together, the Vertical/Centering/Offset State Machine and the Row State Machine control the operation of the system during one frame of operation. Different states of these machines correspond to different phases of the raster frame.

The Vertical Centering/Offset State Machine provides the Row State Machine with the RowBegin signal, which is true when the Vertical Centering/Offset State Machine is in state NsO and the NCtr is at a value of 1 or 0. Also, the Vertical Centering/Offset State Machine, in conjunction with the NCtr counter, determines the row of the single-segment raster data input at which to start the two-segment raster output data so as to center the image on the two-segment display. If the AutoCnEn signal is a 0, then this state machine does not perform the auto centering function, but it still causes the image to be offset by the Row Offset parameter.

Which lines contain valid image data is determined by the signal Display Enable being 1 during the line. The boundaries of the image are determined by the first line with a true Display Enable and the first line without a true Display Enable. These conditions are indicated by the signal lines FirstDE and FirstWithoutDE, respectively, and generated by a logic diagram shown in FIG. 7.

The Reset signal resets the Vertical Centring/Offset State Machine to state Ns0. This state machine then waits for the FirstDE control signal to become 1, at which time it makes a transition to the state Ns1, and in so doing causes RST to be loaded into the NCtr. At each falling edge of the RowClk timing signal, the NCtr counter decrements by 1 until it reaches the value 1. When NCtr reaches the value 1, this state machine makes a transition Nt1 to state Ns2, and once again loads the NCtr with the value RST. The value that remains in the NCtr when the FirstWithoutDE becomes a true signal is computationally equal to the difference between the sum of lines in the two segments in the two segment display and the number of lines in the image to be displayed.

If the signal AutoCnEn is true the state machine makes a transition Nt3 to state Ns3. In so doing, it loads counter NCtr with a value that is half its value at the time of the transition. This value provides the additional lines by which the start of the two-segment output raster data is to be offset from the last line for which the Display Enable has a true value. Transition Nt4 is taken when the NCtr reaches the count 1 and during this transition the NCtr counter is loaded with the value RO. The counter NCtr then counts down to the value 1 and waits for a new cycle of operation of the state machine to begin.

A typical value for the Row Offset parameter is one less than the difference between the total lines in the single-segment raster data stream and the total lines in the two-segment imaging device. Increasing (decreasing) the value in RO by 1 causes the image to move up (down) by one line (if the device images lines from top to bottom).

If AutoCnEn signal is not true, then the Vertical Centring/Offset State Machine does not go to state Nt3 and instead transitions to state Nt2 directly. In state Nt2, the offset of the image is governed only by the value of RO.

The Row State Machine (FIG. 10) controls the row lines in the two-segment imaging device. State Rs0 is the idle state in which the imaging device does not get the signals required to form any image. In state Rs1, the upper segment gets the data directly. In state Rs2, the lower segment gets the data directly.

The signal Reset sets the Row State Machine to idle state Rs0. When in state Rs0, this state machine waits for the RowBegin signal from the Vertical Centering/-Offset State Machine. When this state machine detects a 1 on RowBegin, it loads RCtr with the value RST and makes a transition to state Rs1. The RCtr counter then decrements at each falling edge of the RowClk until the value 1 is reached, at which time the Row State Machine makes a transition to state Rs2 and loads the counter RCtr with the value RST. Once again the RCLr counter decrements for each RowClk until its value is 1. When this happens, the Row State Machine makes a transition to state Rs0. The Row State Machine then waits for the RowBegin signal to become true again to begin a new cycle of operation.

The Column State Machine (FIG. 11) controls the operation of the system during one line of operation. Different states of the Column State Machine correspond to different phases of the raster line.

State Cs0 is the idle state and corresponds to the horizontal retrace time. During this time, the DRAM in memory M1 is given signals to perform a cas-before-ras refresh operation controlled by the counter PhCtr. In this mode of refresh operation, the $\overline{cas}$ signal is set to active low and the $\overline{ras}$ cycles between active and inactive state. The Column State Machine goes through the operation only when the RowOper signal is 1. The RowOper signal is supplied by the Row State Machine.

When RowOper becomes 1, the Column State Machine makes a transition to state Cs1 as soon as RowClk is 1 and PhCtr is in phase 0, 1, 2 or 3. The reason for waiting for the PhCtr to be in phase 0 to 3 is that during these phases of PhCtr, $\overline{ras}$ is inactive and a change in the state of the Column State Machine here avoids marginal signals being generated on $\overline{ras}$ which could affect the integrity of the data stored in the DRAM memory M1.

In state Cs1, the Column State machine waits for the display enable signal DE to become true, at which time it makes transition Ct1 and in so doing loads the counter CCtr with the value CO (column offset value) and resets the phase counter PhCtr. At each pixel clock the counter CCtr counts down by 1 until it reaches the value 0, at which time the Column State Machine transitions by way of state Ct2 to state Ct3 (the ColOper phase). During this phase, the single-stream raster input data moves through the data paths shown in FIG. 1 and is both directly supplied to one segment of the two-segment imaging device and stored in the DRAM memory M1, while the other segment receives the raster data that is read out from memory M1.

We claim:

1. A system for compressing raster-image data in sequential frames in a single data stream which is converted to two streams of pixels for each of said sequential frames of said single data stream; said two pixel streams being suitable for controlling images on a raster imaging surface having first and second segments therein;

said imaging surface being responsive to signals representing characteristics such as color or intensity of pixels to produce raster images in the portions of said segments receiving said signals, said images in said segments within a frame being produced by a raster image-producing means in a plurality n of sequentially produced lines in said imaging surface, said system comprising:

a first and a second transformation module having inputs and outputs;

means for supplying said single stream of pixels to said first and said second transformation modules;

means for utilizing the output from said first transformation module to alternately produce a raster image on the first and second segments for a frame;

means for delaying the output from said second transformation module to alternately produce a raster image on the second and first segments for the frame;

means for deleting selected ones of said pixels in said stream of pixels for each one of said plurality of n lines; and means for compressing the remaining ones of said pixels for each one of said n lines to reduce the width of said produced image.

2. A system in accordance with claim 1 including skip data control means connected to control said outputs of said first and said second transformation modules; and means for energizing said skip data control means to generate a skip data control signal to selectably delete said selected ones of said pixels in said pixel stream from said outputs of said first and said second transformation modules.

3. A system in accordance with claim 2 including first and second shift registers having inputs connected to the outputs of said first and said second transformation modules, and means for supplying said skip data control signal to said first and said second shift registers to selectably delete said selected ones of said pixels from said pixel stream.

4. A system in accordance with claim 1, wherein said compressing means comprises a first shift register having an input terminal for receiving said output of said first transformation module.

5. A system in accordance with claim 4, wherein said compressing means further comprises a second shift register having an input terminal for receiving said output of said second transformation module.

6. A system in accordance with claim 5, wherein said deleting means comprises an AND gate having an output terminal connected to a clock input terminal of said first shift register and to a clock input terminal of said second shift register.

7. A data compression system for compressing raster image data for driving a raster imaging surface comprising a plurality K of segments, said raster image data being received in a single data stream and converted to a plurality K of streams of pixels for driving said K segments, said segments being responsive to receipt of signals from said K streams of pixels to produce raster images, said images within a frame being produced in a plurality n of sequentially produced lines in said imaging surface, said system comprising:

means for converting said single data stream to K output streams of pixels;

a plurality K of receiving circuits each having an input for receiving respective ones of said K output streams of pixels, each of said receiving circuits having an output;

means coupled to said receiving circuits for selectably deleting ones of said pixels in said K streams of pixels;

means for compressing the remaining ones of said pixels to reduce the width of the produced image;

means for applying ones of said K streams of pixels to corresponding ones of said K segments; and means for delaying the application of other of said K streams of pixels to corresponding ones of said K segments.

8. The system of claim 7, wherein said deleting means further comprises a control means for generating a control signal coupled to said K receiving circuits to selectably delete selected ones of said pixels for each one of said plurality of n lines in said K streams of pixels.

9. The system of claim 8, wherein said means for compressing comprises a plurality K of shift registers, one for each of said K streams of pixels, each of said K shift registers having a clock input terminal for receiving said control signal from said control means and a data input terminal for receiving the associated stream of pixels, wherein said K shift registers load a pixel in response to said control signal.

10. The system of claim 9, wherein said control means comprises an AND gate having an output terminal connected to said clock input terminal of each of said K shift registers.

11. The system according to claim 7, wherein said receiving circuits comprise transformation modules.

* * * * *

UNITED STATES PATENT AND TRADEMARK OFFICE

CERTIFICATE OF CORRECTION

PATENT NO. : 5,422,996

DATED : June 6, 1995

INVENTOR(S) : Patil et al.

It is certified that error appears in the above-identified patent and that said Letters Patent is hereby corrected as shown below:

Col. 3, lines 21-22
delete "Half frame ... preferably"

Col. 6, line 41
delete "De" and insert --be--

Col. 7, line 44, Col. 8, lines 5 and 40
delete "Centring" and insert --Centering--

Signed and Sealed this

Twelfth Day of March, 1996

Attest:

Bruce Lehman

BRUCE LEHMAN

*Attesting Officer*

*Commissioner of Patents and Trademarks*